(12) United States Patent
Hallett et al.

(10) Patent No.: US 8,662,549 B2
(45) Date of Patent: Mar. 4, 2014

(54) FITTING, CRANE HOOK, AND CRANE HOOK ASSEMBLY

(71) Applicant: Airbus Operations Limited, Bristol (GB)

(72) Inventors: Richard Lester Hallett, Bristol (GB); Peter William Spence, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/651,543

(22) Filed: Oct. 15, 2012

(65) Prior Publication Data

US 2013/0045075 A1 Feb. 21, 2013

Related U.S. Application Data

(62) Division of application No. 12/449,165, filed as application No. PCT/GB2008/050027 on Jan. 14, 2008, now Pat. No. 8,313,131.

(30) Foreign Application Priority Data

Jan. 26, 2007 (GB) .................................. 0701543.1

(51) Int. Cl.
*B66C 1/62* (2006.01)
*B64C 1/20* (2006.01)
(52) U.S. Cl.
USPC ....................... 294/82.1; 294/215; 244/102 R
(58) Field of Classification Search
USPC ..................... 294/82.1, 215, 82.19, 67.22, 89; 244/100 R, 102 A, 102 R, 131; 24/598.4; 59/95; 403/78, 122, 118
See application file for complete search history.

(56) References Cited

U.S. PATENT DOCUMENTS

| | | | |
|---|---|---|---|
| 1,097,813 A | 5/1914 | Martin |
| 1,126,282 A | 1/1915 | Riley |
| 1,829,964 A | 11/1931 | Randall |
| 2,283,354 A | 5/1942 | Dalzell |

(Continued)

FOREIGN PATENT DOCUMENTS

| | | |
|---|---|---|
| DE | 952 558 | 11/1956 |
| DE | 298 00 854 | 4/1993 |

(Continued)

OTHER PUBLICATIONS

International Search Report for PCT/GB2008/050027 dated Apr. 23, 2008.

(Continued)

*Primary Examiner* — Paul T Chin
(74) *Attorney, Agent, or Firm* — Nixon & Vanderhye P.C.

(57) ABSTRACT

A method of lifting an aircraft at a lifting location including the steps of securing a fitting to the aircraft when the aircraft is at the lifting location, the fitting including an attachment member configured to be secured to the item and a lifting member which is pivotally coupled to the attachment member. The lifting member has a socket for engaging a crane hook. Engaging the fitting with the crane hook and transmitting lifting load from the crane hook to the aircraft via the fitting. The crane hook has an attachment link having a first pivot point attached to the hook forward of its center of gravity, and a second pivot point configured to be lifted by a crane.

14 Claims, 12 Drawing Sheets

(56) References Cited

U.S. PATENT DOCUMENTS

| | | |
|---|---|---|
| 2,323,819 A | 7/1943 | Lewis |
| 2,815,976 A | 12/1957 | Hammit |
| 2,925,299 A | 2/1960 | Koons et al. |
| 3,160,288 A | 12/1964 | Kelly |
| 3,347,327 A | 10/1967 | Gunter et al. |
| 3,602,544 A | 8/1971 | Marsh |
| 3,749,361 A | 7/1973 | Johnson |
| 3,785,691 A | 1/1974 | Sperry |
| 4,174,132 A | 11/1979 | Crook, Jr. |
| 4,304,432 A | 12/1981 | Silva |
| 4,345,727 A | 8/1982 | Brown et al. |
| 4,520,974 A | 6/1985 | Debeneix |
| 4,669,618 A | 6/1987 | Brand |
| 5,176,341 A | 1/1993 | Ishikawa et al. |
| 5,277,463 A | 1/1994 | Singh et al. |
| 5,755,526 A | 5/1998 | Stanevich |
| 6,017,071 A | 1/2000 | Morghen |
| 6,131,976 A | 10/2000 | Silva |
| 6,652,012 B1 | 11/2003 | Fuller et al. |
| 7,497,638 B2 | 3/2009 | Tubbs et al. |
| 7,637,686 B2 | 12/2009 | Wood et al. |
| 8,083,175 B2 | 12/2011 | Stark et al. |
| 2012/0175901 A1* | 7/2012 | Eastall ......................... 294/82.1 |

FOREIGN PATENT DOCUMENTS

| | | |
|---|---|---|
| DE | 102 52 896 | 5/2004 |
| GB | 417 813 | 10/1934 |
| GB | 548671 | 10/1942 |
| GB | 646280 | 11/1950 |
| GB | 871 409 | 6/1961 |
| GB | 2 261 651 | 5/1993 |
| JP | 42-27416 | 12/1942 |
| JP | 62-174451 | 11/1987 |
| JP | 8-188373 | 7/1996 |
| JP | 2006-124129 | 5/2006 |
| WO | WO 2004/087459 | 12/2004 |

OTHER PUBLICATIONS

Written Opinion for PCT/GB2008/050027 dated Apr. 23, 2008.
Search Report for GB 0701543.1 dated Aug. 8, 2007.
Search Report for GB 0701543.1 dated Mar. 23, 2007.
EP Communication and Search Report dated Feb. 24, 2011 for EP 10197441.8.
English Translation of Office Action dated Feb. 24, 2012 in CN 200880002999.6.
Japanese Office Action Summary issued Jan. 29, 2013 in JP 2009-546817 and English translation.

* cited by examiner

FITTING, CRANE HOOK, AND CRANE HOOK ASSEMBLY

This application is a Division of application Ser. No. 12/449,165, filed Jul. 27, 2009, which is the U.S. national phase of international application PCT/GB2008/050027, filed in English on 14 Jan. 2008, which designated the U.S. PCT/GB2008/050027 claims priority to GB Application No. 0701543.1 filed 26 Jan. 2007. The entire contents of these applications are incorporated herein by reference.

FIELD OF THE INVENTION

The invention provides a fitting, crane hook and crane hook assembly which are particularly suitable for lifting an aircraft, but may also be used to lift other loads. The invention also relates to a method of lifting an aircraft.

BACKGROUND OF THE INVENTION

Crane recovery of an aircraft is a preferred method for many airports. However some aircraft do not have a strong point which is both accessible from above, and is suitably configured to attach a lifting sling or crane hook.

One solution to this problem is to inflate an airbag under a wing of the aircraft. However for large aircraft this may cause instability concerns, particularly if the airbag is wet. Also the tendency of the wing to bend as the lifting occurs increases the total height of the airbag lift required, thereby exacerbating the problem.

SUMMARY OF THE INVENTION

A first aspect of the invention provides apparatus for lifting an aircraft at a lifting location, the apparatus comprising:
 a fitting configured to be secured to the aircraft when the aircraft is at the lifting location; and
 a crane hook configured to engage the fitting and transmit lifting load to the aircraft via the fitting.

The first aspect of the invention also provides a method of lifting an aircraft at a lifting location, the method comprising:
 securing a fitting to the aircraft when the aircraft is at the lifting location;
 engaging the fitting with a crane hook;
 transmitting lifting load from the crane hook to the aircraft via the fitting; and
 removing the fitting from the aircraft.

The first aspect of the invention recognises that a crane hook fitting permanently mounted to the aircraft would be unacceptably heavy. Therefore the fitting is only secured to the aircraft for the lifting operation, and removed afterwards. That is, the fitting is secured to the aircraft when the aircraft is at a lifting location such as a runway, or an area adjacent to a runway (if the aircraft has overshot or veered to the side of the runway during a landing).

Typically the fitting has a first part configured to engage the crane hook; and a second part configured to engage a lowering device (which may also be a crane hook).

A second aspect of the invention provides a fitting for transmitting lifting loads from a crane hook to an item, the fitting comprising:
 an attachment member configured to be secured to the item; and
 a lifting member which is pivotally coupled to the attachment member and configured to be engaged by the crane hook so as to transmit lifting loads from the crane hook to the item.

The second aspect of the invention also provides a method of lifting an item using such a fitting, the method comprising:
 lowering the fitting into position with the lifting member positioned below the attachment member;
 securing the attachment member to the item;
 lifting the lifting member by rotating it about its pivot until it engages the item;
 engaging the lifting member with a crane hook; and
 transmitting lifting load from the crane hook to the item via the lifting member.

The pivotal connection between the two parts of the fitting enables it to be secured in place without having to lift the whole fitting (which may weigh over 100 kg, and may be as much as 350 kg). Instead, the fitting is lowered into place, and only the lifting member needs to be lifted by rotating about the pivot. By making the lifting member sufficiently light (preferably less than 100 kg) this operation can be performed manually by one or two people.

Typically the attachment member and lifting member engage the same strong point (that is, a reinforced region of the item) giving a compact arrangement.

The lifting member may engage the item in such a way that it can transmit side loads to the item. However more preferably some or all of the side load from the crane hook is transmitted to the item via the attachment member.

Preferably the fitting is configured so that substantially no vertical lifting load is transferred from the crane hook to the item via the attachment member. For example the pivotal connection may be pivotally coupled to the attachment member by a floating connection.

The fitting may be used to lift any item, but is particularly suited to a method of lifting an aircraft.

A third aspect of the invention provides a crane hook assembly comprising:
 a hook having a centre of gravity;
 an attachment link having a first pivot point attached to the hook forward of its centre of gravity, and a second pivot point configured to be lifted by a crane; and
 a biasing system which applies a biasing force to the attachment link causing the attachment link to rotate about the first pivot point whereby the second pivot point moves towards the rear of the hook when the hook is unloaded.

The third aspect of the invention also provides a method of lifting an item using such a hook assembly, the method comprising:
 coupling the hook to the item; and
 applying a lifting force to the second pivot point of the attachment link whereby the second pivot point rotates towards the front of the hook against the biasing force.

The attachment link and associated biasing system ensure that the hook hangs substantially vertically when it is unloaded, making it easier to secure in place.

The hook assembly may be used to lift any item, but is particularly suited to a method of lifting an aircraft.

In its simplest form, the biasing system may consist of a biasing member such as a gas strut, or a tension or compression spring attached at one end to the attachment link and at the other end to the hook. However a problem with such an arrangement is that the biasing member must exert a large biasing force. Therefore in a preferred embodiment the biasing system comprises a first biasing link coupled to the hook at a first pivot point; a second biasing link coupled to the first biasing link at a second pivot point and to the attachment link at a third pivot point; and a biasing member which applies a biasing force causing the pivot points of the biasing links to move towards a co-linear configuration. Such a system employs mechanical advantage to reduce the force applied by the biasing member. The biasing member may be for example a gas strut or a spring, attached to the hook or the attachment link.

A fourth aspect of the invention provides a crane hook comprising a shank portion; and a hook portion extending from the shank portion, the hook portion having a ball or socket configured to couple with a socket or ball on an item to be lifted.

The fourth aspect of the invention also provides a method of lifting an item with such a hook, the method comprising:
forming a ball and socket joint by coupling the ball or socket on the hook with the socket or ball on the item; and
applying lifting load to the item via the ball and socket joint.

In the preferred embodiment described below, the hook portion has a ball configured to couple with a socket in the item to be lifted. However in an alternative embodiment the hook portion may have a socket configured to couple with a ball in the item to be lifted. In both cases, the resulting ball-and-socket joint enables relative rotation between the parts in any direction.

Preferably the ball or socket remains stationary with respect to the hook during use: thus it may either be a separate part which is fixed to the hook, or it may be integrally formed with the hook.

The hook may be used to lift any item, but is particularly suited to a method of lifting an aircraft.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
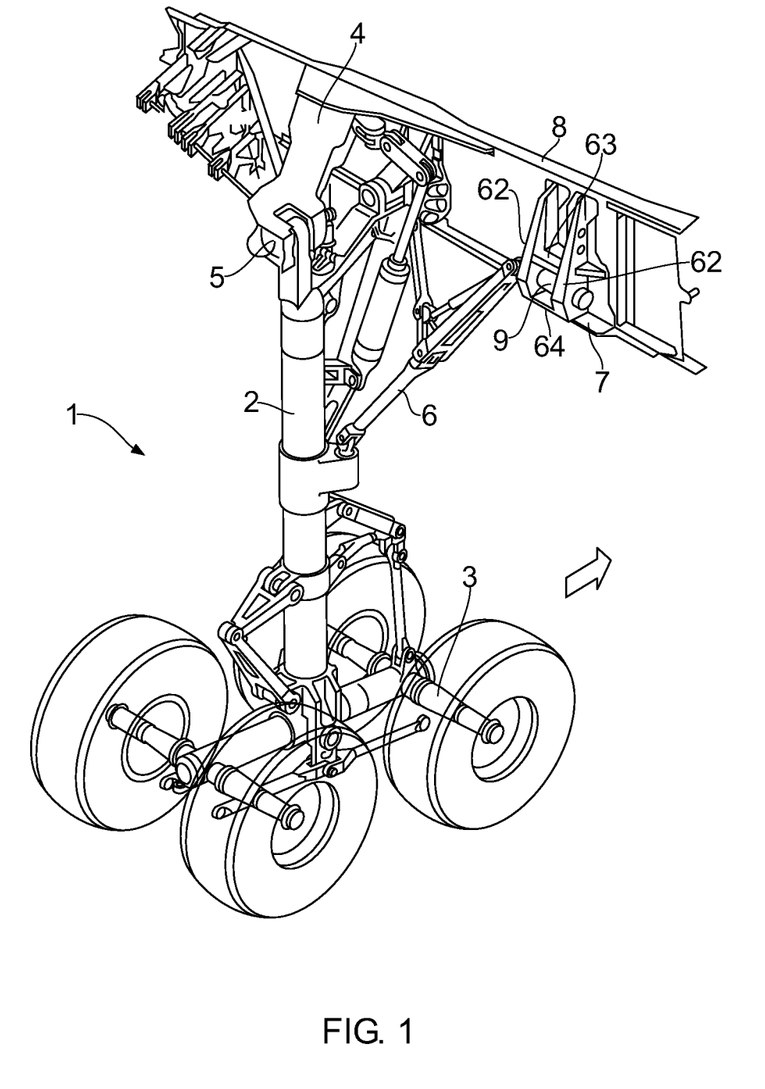
FIG. 1 shows a main landing gear of an aircraft.

A main landing gear of an Airbus A340 aircraft is shown in FIG. 1. The landing gear comprises a main landing gear leg 2 which carries a wheel assembly 3. The main landing gear leg 2 is attached to the wing structure, typically at a rear spar 8 and gear support rib 4 via a rear pintle-pin fitting 5. A side stay assembly 6 is pivotally attached to the main landing gear leg 2 at one end, and to a side stay fitting 7 at its other end. The side stay fitting 7 is fitted to a rear spar 8 of a wing.

In the event that the main landing gear 1 does not lower fully to its deployed position shown in FIG. 1 prior to landing, or fails during landing, then the aircraft will tilt to one side and that side of the aircraft will need lifting onto a support cradle.

Because the large structural components above the main landing gear leg 2 are covered by an upper wing cover (not shown) it is not possible to gain access to them to attach a sling. The side stay fitting 7 provides a strong point which is more accessible from above, but has no structure which can support a sling easily. Accordingly, the fitting 10 shown in FIGS. 2-7 is used to transmit lifting load from a crane hook to the side stay fitting 7.

In a first step, an aperture is made in the upper skin (not shown) of the wing by removing access panels. Next, the side stay assembly 6 (including a cardan pin 9 which couples it to the side stay fitting 7) is removed. Next, a crane lowers the fitting 10 through the aperture from above in the configuration shown in FIG. 2

Figure 2:
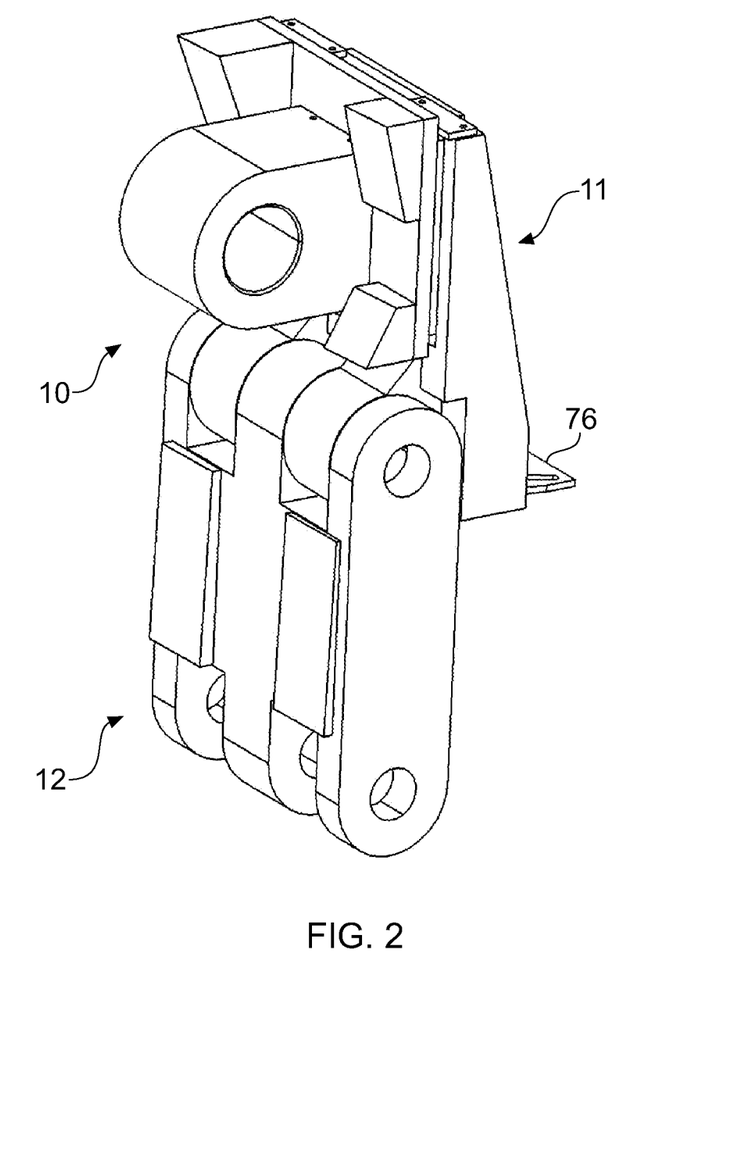
FIG. 2 shows a fitting in its inoperative position in which it is lowered by a crane.

The fitting 10 comprises an attachment assembly 11 which is configured to be secured to the side stay fitting 7, and a lifting assembly 12 which is pivotally coupled to the attachment assembly 11 and configured to be engaged by a crane hook so as to transmit lifting loads from the crane hook to the aircraft.

The attachment assembly 11 incorporates an eye pin 24 (shown in FIG. 3 but omitted from all other figures) at its upper end which is used to lower the fitting in the configuration shown in FIG. 2 with the lifting assembly 12 hanging below the attachment assembly 11.

Figure 3:
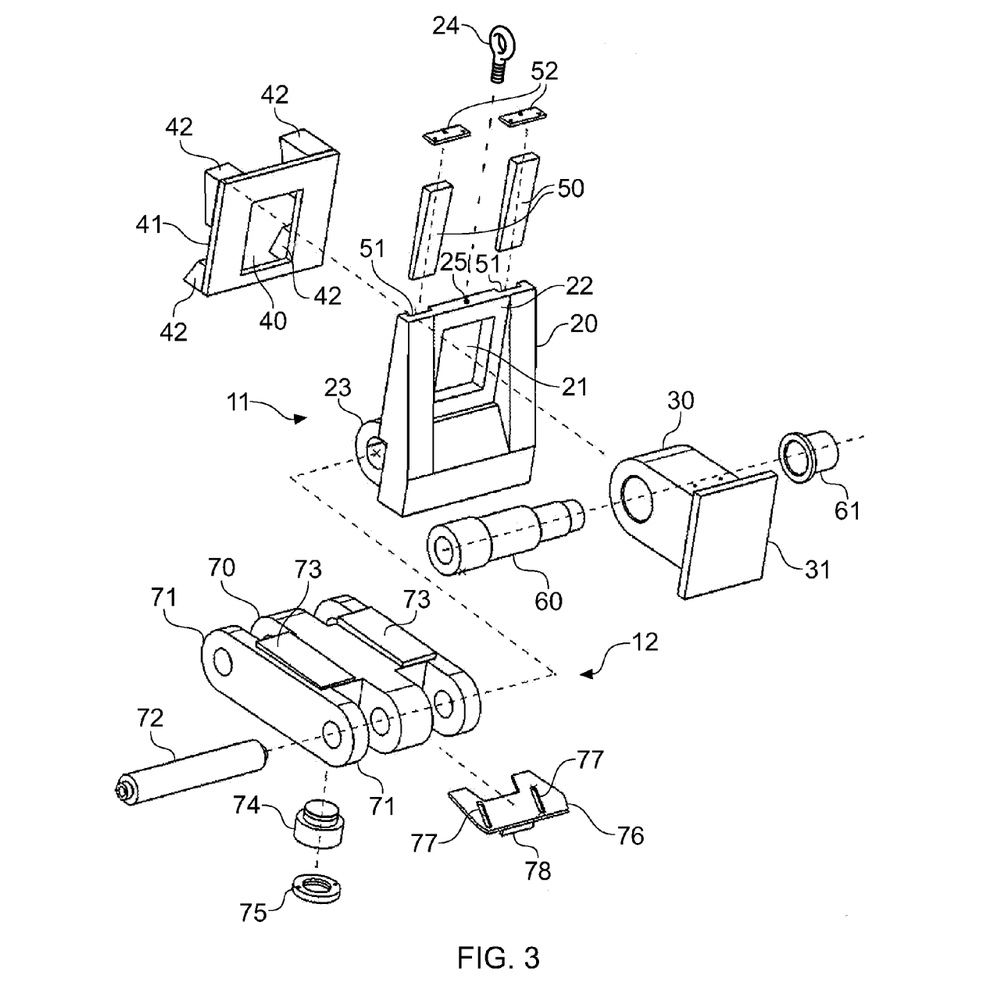
FIG. 3 is an exploded view of the crane fitting.
Figure 4:
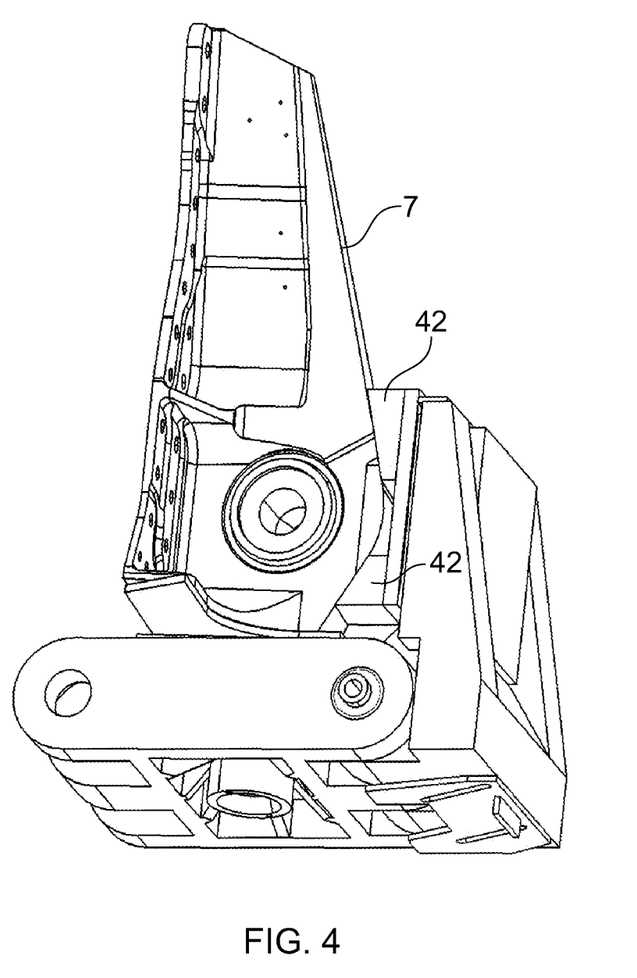
FIG. 4 is an isometric view of the side stay fitting and crane fitting taken from below and the right hand side.

The various parts of the fitting 10 are shown in the exploded view of FIG. 3.

The attachment assembly 11 comprises a vertical plate 20 with a hole 21 bounded by a frame 22. A pair of lugs 23 extend from the lower edge of the vertical plate 20 (only one of the lugs 23 being visible in FIG. 3). A trunnion block 30, commonly referred to as a tombstone fitting, passes through the hole 21 in the vertical plate 20, with a tombstone flange 31 engaging the frame 22. The tombstone 30 also passes through a hole 40 in a side clamping plate 41. The side clamping plate 41 has four trapezoidal blocks 42 which engage the side stay fitting 7 as shown most clearly in FIG. 4. Pre-tensioning wedges 50 are received in slots 51 in the rear face of the vertical plate 20. Wedge retention plates 52 are attached to the vertical plate 20 above the slots 51 as shown most clearly in FIG. 5.

An eye pin 24 is screwed into a hole 25 in the upper edge of the vertical plate 20, and has an eye which is engaged by a conventional crane hook or lifting sling to lower the fitting into place. Note that the eye pin 24 and hole 25 are shown in FIG. 3 but omitted from all other figures.

Figure 6A:
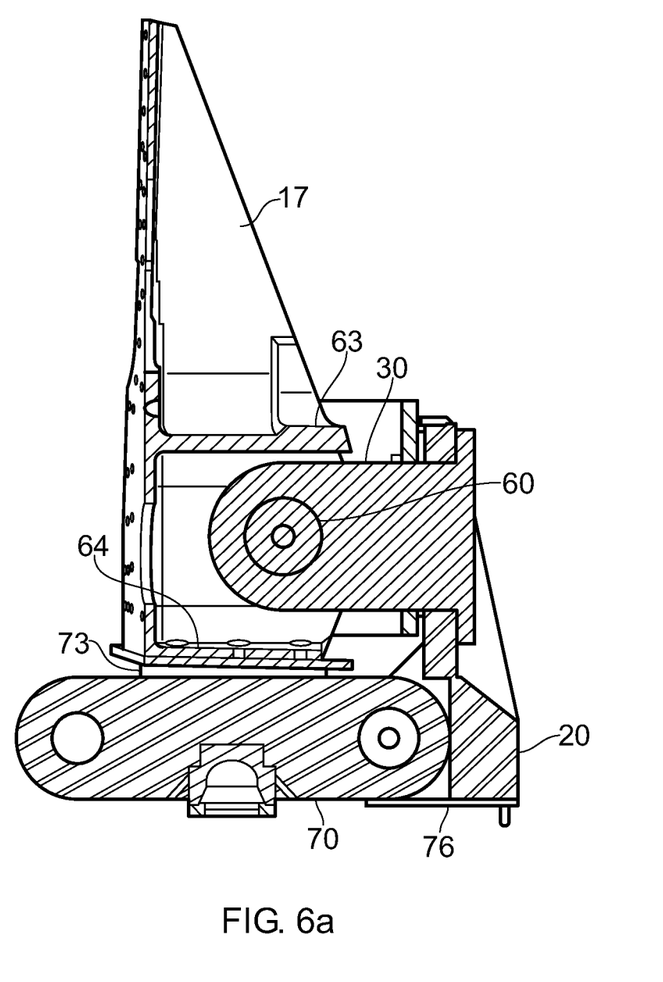
FIG. 6a is a second cross section through the side stay fitting and crane fitting.
Figure 6B:
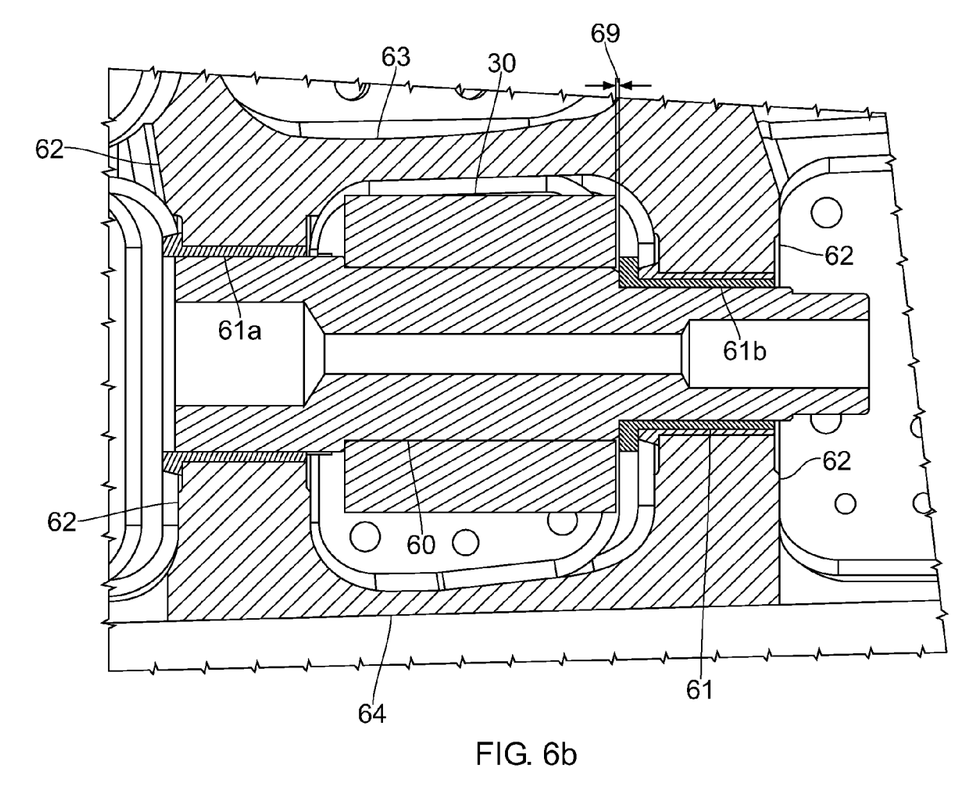
FIG. 6b is a cross section through part of the side stay fitting and crane fitting.

The attachment assembly 11 is fitted to the side stay fitting 7 as shown most clearly in FIGS. 6a and 6b. The side stay fitting 7 has a pair of lugs 62 which receive the cardan pin 9, and upper and lower flanges 63,64 respectively. The fitting 10 is lowered by the crane hook until the tombstone 30 is aligned with the gap between the lugs 62 and flanges 63,64. The tombstone 30 is then inserted into the gap into the position shown in FIGS. 6a and 6b, and a dummy cardan pin 60 is inserted, securing the attachment assembly 11 to the lugs 62. The dummy cardan pin 60 engages a dummy bush 61 and a pair of existing bushes 61a,61b as shown in FIG. 6b. After the dummy cardan pin 60 has been fitted, the crane hook supporting the fitting 10 is removed.

The clearance (indicated at 69 in FIG. 6b) between the tombstone 30, the side stay lugs 62 and the flange of the bush 61 is kept to less than 1.0 mm. This ensures the sliding motion along the dummy cardan pin 60 is limited to +/−0.5 mm.

Figure 5:
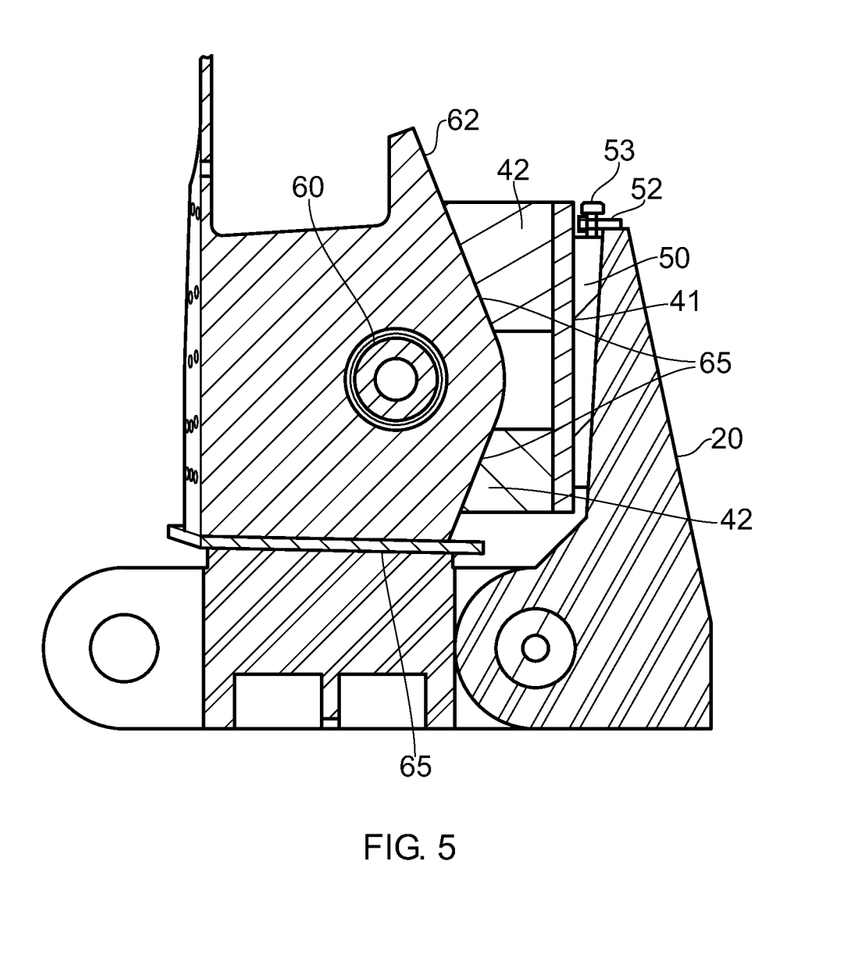
FIG. 5 is a first cross section through the side stay fitting and crane fitting.

As shown most clearly in FIG. 5, the trapezoidal blocks 42 engage the side stay lugs 62 at contact faces 65. The contact faces of the blocks 42 may be covered with a protective layer to protect the sidestay fitting from damage. The protective layer may be, for example, a hard polyurethane material or a soft metal such as brass or aluminium.

Because the side stay fitting 7 is handed, the blocks 42 are reversible to enable the same fitting 10 to be used on either wing. The wedges 50 between the vertical plate 20 and the side clamping plate 41 eliminate backlash in the assembly at zero load. By adjusting screws 53 passing through the wedge clamp plates 52, the screws 53 force the wedges 50 in, to provide a light clamping of the tombstone 30 onto the dummy cardan pin 60 and the trapezoidal blocks 42 onto the sidestay fitting.

Returning to FIG. 3, the lifting assembly 12 will now be described. The main component of the lifting assembly is a lifting pad 70, with three hinge lugs 71 at either end. Note that more or fewer lugs may be provided if necessary. By having hinge lugs 71 at both ends, the lifting assembly 12 can be reversed relative to the attachment assembly 11 to enable the same fitting 10 to be used on either wing. The pair of hinge lugs 23 on the vertical plate 20 are received in the slots between the hinge lugs 71, and a hinge pin 72 passes through the aligned holes in the hinge lugs 71, 23. Trapezoidal blocks 73 are mounted on an upper face of the lifting pad 70. The contact faces of the blocks 73 may be covered with a protective layer to prevent damage to the aircraft structure. The protective layer may be, for example, a hard polyurethane material or a soft metal such as brass or aluminium.

A hook socket member 74, hook retainer 75 and locking plate 76 are mounted on a lower face (not shown) of the lifting pad 70. The locking plate 76 comprises a pair of slots 77 and a handle 78. The locking plate is slidably mounted to the bottom face of the lifting pad by a pair of pins (not shown) extending downwardly from the bottom face of the lifting pad 70, and passing through the slots 77 of the locking plate 76. The pins have nuts screwed onto their distal ends which prevent the locking plate 76 from falling off. The locking plate 76 can be retracted to its release position shown in FIG. 2 in which it disengages the lifting assembly 12, allowing it to hang down in the configuration shown. After the attachment assembly has been fitted to the side stay bracket 17, the lifting pad 70 is rotated about hinge pin 72 by 90° up to the operative position shown in FIG. 3 in which the blocks 73 engage the underside of the lower flange 64 of the side stay fitting at a contact face 65 shown in FIG. 5. The weight of the lifting pad 70 is less than 100 kg to enable this to be achieved by two men. The downwardly directed contact face 65 of the side stay fitting 7 provides a suitably strong interface to transmit lifting loads without causing significant damage to the aircraft.

Figure 7A:
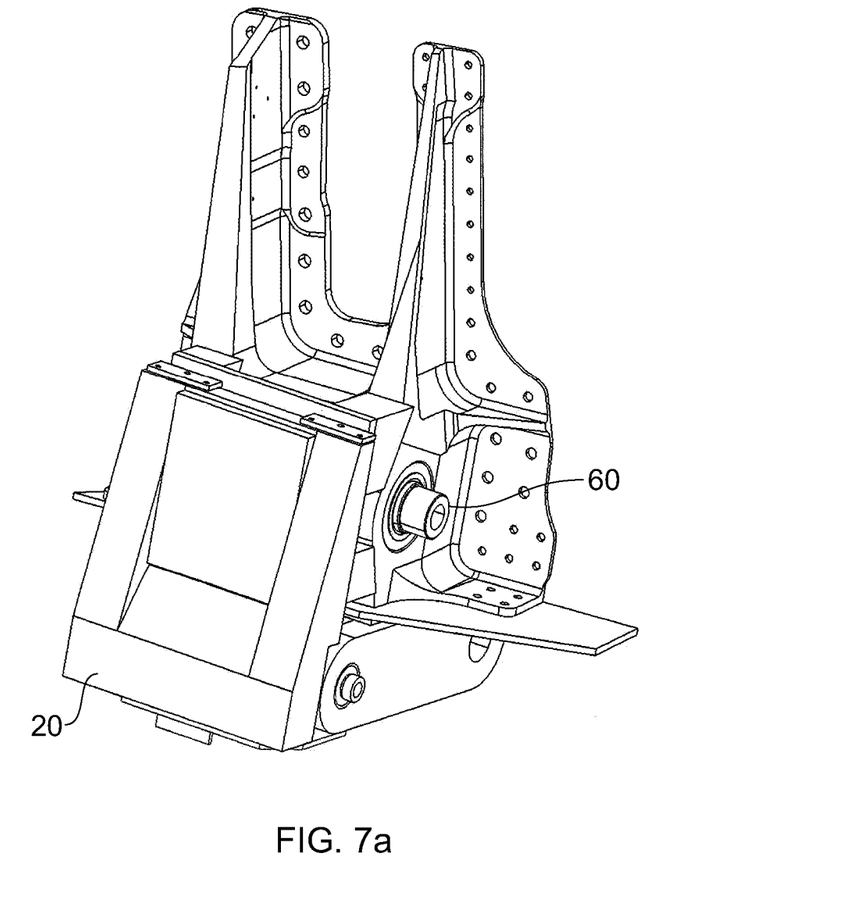
FIG. 7a is an isometric view of the side stay fitting and crane fitting taken from the front and left hand side.

The lifting pad is then locked into its operative position by grasping the handle 78 of the locking plate 76, and sliding it forward to the locking position shown in FIG. 7a. In the locking position, the locking plate 76 engages both the vertical plate 20 and two of the hinge lugs 71 of the lifting pad 70, preventing the lifting pad 70 from dropping back down.

Figure 11:
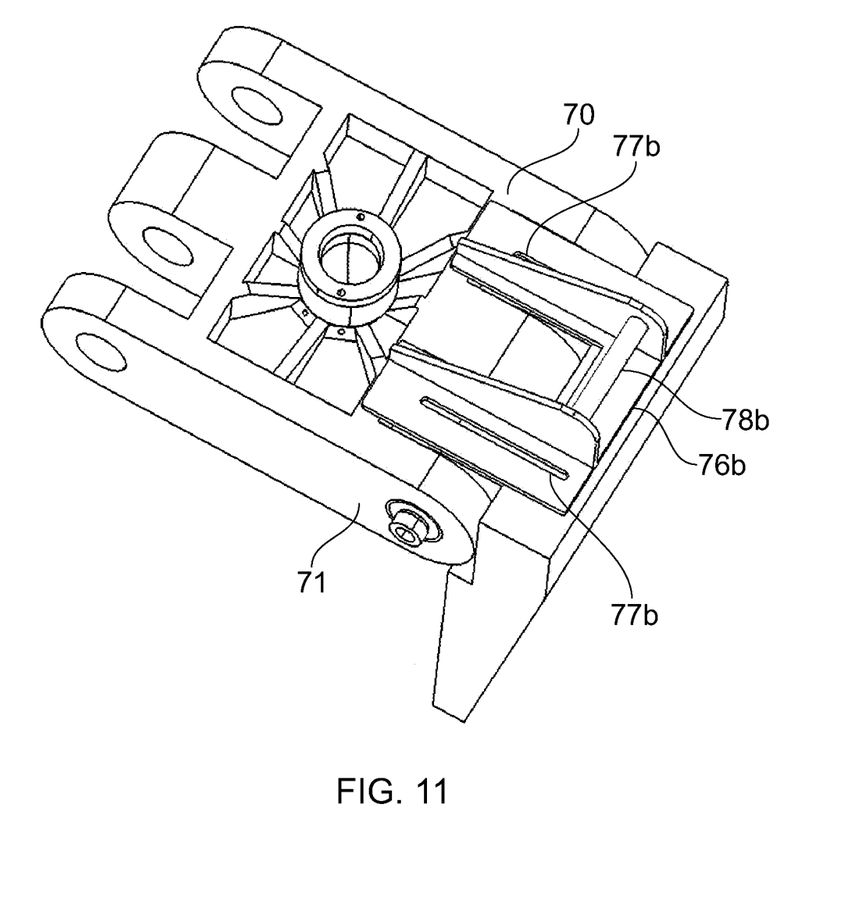
FIG. 11 is a view of the underside of a lifting pad with an alternative locking plate.

An alternative locking plate 76b is shown in FIG. 11. The locking plate 76b has a handle 78b and a pair of slots 77b. The locking plate 76b is operated in a similar manner to locking plate 76, although in the locking position shown in FIG. 11 it engages the pad 70 between the hinge lugs 71, instead of engaging a pair of the hinge lugs 71.

Figure 8:
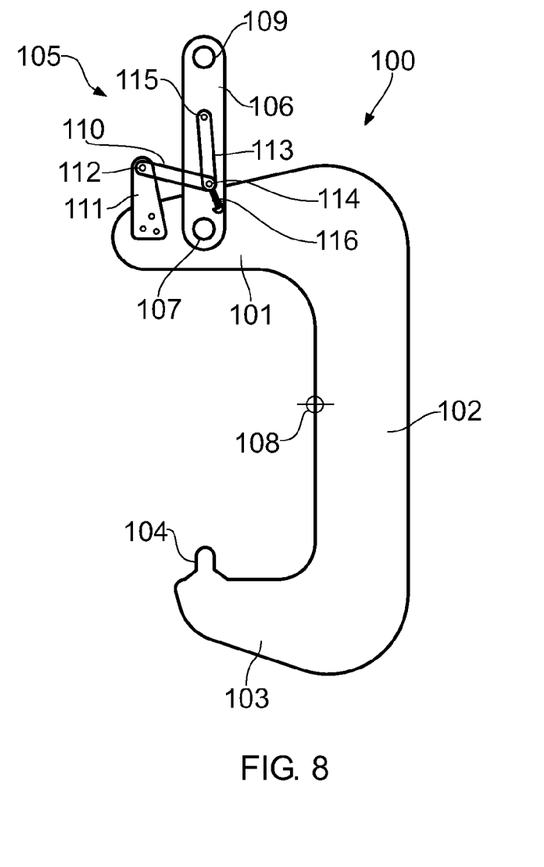
FIG. 8 is a side view of a crane hook assembly in its loaded state.
Figure 9:
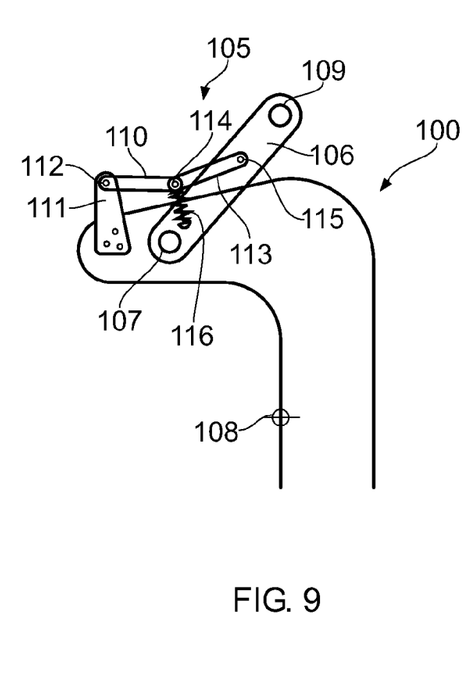
FIG. 9 is a side view showing part of the crane hook assembly in its unloaded state.
Figure 10A:
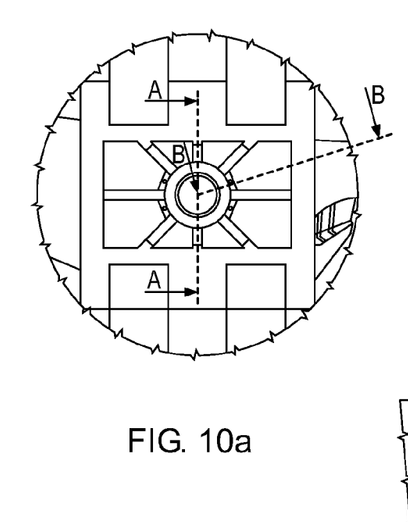
FIG. 10a is a view of the underside of the lifting pad.
Figures 10B, 10C:
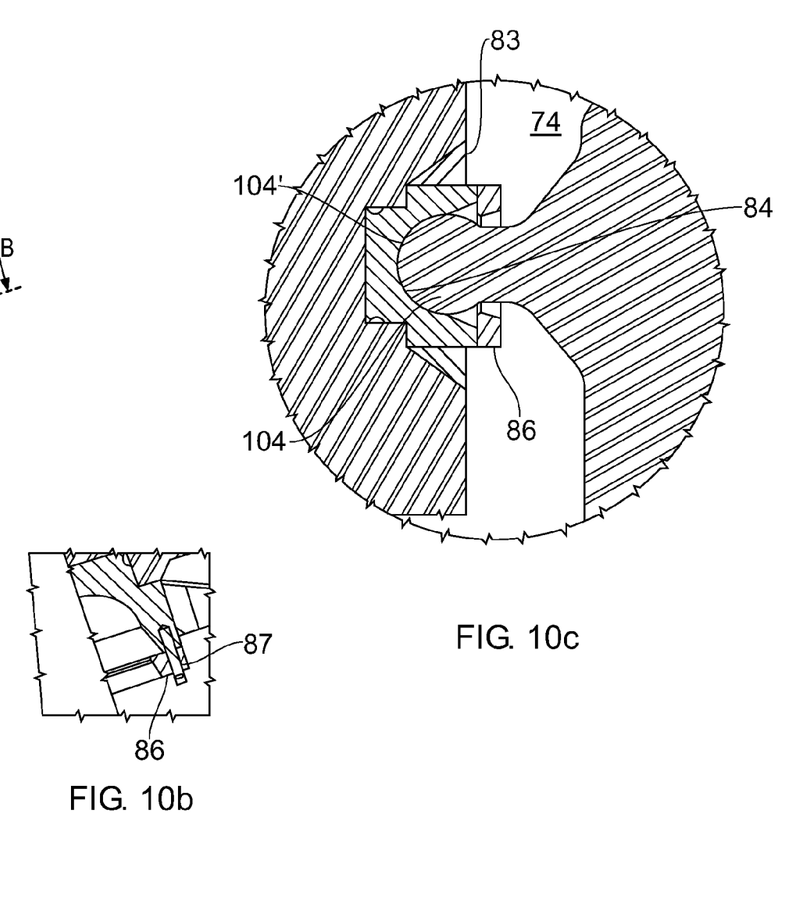
FIG. 10b is a sectional view taken along line B-B in FIG. 10a, also showing the ball retaining ring.
FIG. 10c is a sectional view taken along line A-A in FIG. 10a with the ball and retaining ring in place.

The crane hook assembly 100 shown in FIGS. 8 and 9 is then lowered into place and engages a socket on the underside of the lifting pad as shown in FIGS. 10a-10c.

The hook assembly 100 includes a generally C-shaped hook with a vertical shank portion 102, a lifting portion 101 extending forwardly from an upper end of the shank portion; and a hook portion 103 extending forwardly from a lower end of the shank portion. The shank portion 102 is sufficiently long to accommodate the depth of the rear spar 8. The hook portion 103 has an integrally formed ball 104 projecting upwardly and positioned towards its distal end. The lifting portion 101 of the hook carries a pair of lifting mechanisms for ensuring that the hook will always be in the vertical position when being lifted, i.e. either loaded or unloaded. The weight of the assembly 100 is approximately 1500 Kg.

One of the two lifting mechanisms is attached to the left-hand side of the lifting portion 101 and is indicated at 105 in FIG. 8. The other lifting mechanism is a mirror image of the lifting mechanism 105 and is attached to the right-hand side of the lifting portion 101 so is not visible.

The lifting mechanism 105 comprises an attachment link 106 having a first pivot pin 107 attached to the hook forward of its centre of gravity 108, and a second pivot pin 109 which is coupled to the attachment link of the right-hand lifting mechanism (not shown). The hook assembly is lifted by coupling a crane hook to the pin 109. A biasing system applies a biasing force to the attachment link 106 causing it to rotate about the first pivot pin 107 whereby the second pivot pin 109 moves towards the rear of the hook to the position shown in FIG. 9 when the hook is unloaded.

The biasing system comprises a first biasing link 110 coupled to the hook via an arm 111 at the distal end of the upper lifting portion 103 and a first pivot point 112; a second biasing link 113 coupled to the first biasing link 110 at a second pivot point 114 and to the attachment link 106 at a third pivot point 115; and a compression spring 116 which applies a biasing force causing the pivot points 112,114,115 to move towards the approximately co-linear configuration shown in FIG. 9. The biasing system includes a mechanical stop (not shown) which prevents the pivot points 112,114,115 from moving to a fully co-linear configuration.

In the unloaded configuration shown in FIG. 9, the spring 116 pushes the attachment link 106 over by an angle of approximately 40 degrees so that the pivot pin 109 is above the hook's centre of gravity 108. Hence, as the hook is lifted into position it will be in an upright position, enabling it to be easily coupled to the fitting 10. Then as the lifting load is applied, the lifting force applied to the second pivot pin 109 of the attachment link 106 causes it to rotate towards the front of the hook against the biasing force of the spring. In the loaded position shown in FIG. 8, the moment tending to push the attachment link 106 away from the vertical is reduced to a low value, but sufficient to ensure the link 106 rotates back to its unloaded position as the load on the hook approaches zero. The right-hand lifting mechanism (not shown) moves together with the left-hand lifting mechanism 105 in a similar manner.

In an alternative embodiment (not shown) the spring 116 may be coupled at one end to the pivot point 114, and at its other end to the lifting portion 101 of the hook (instead of the attachment link 106).

Figure 7B:
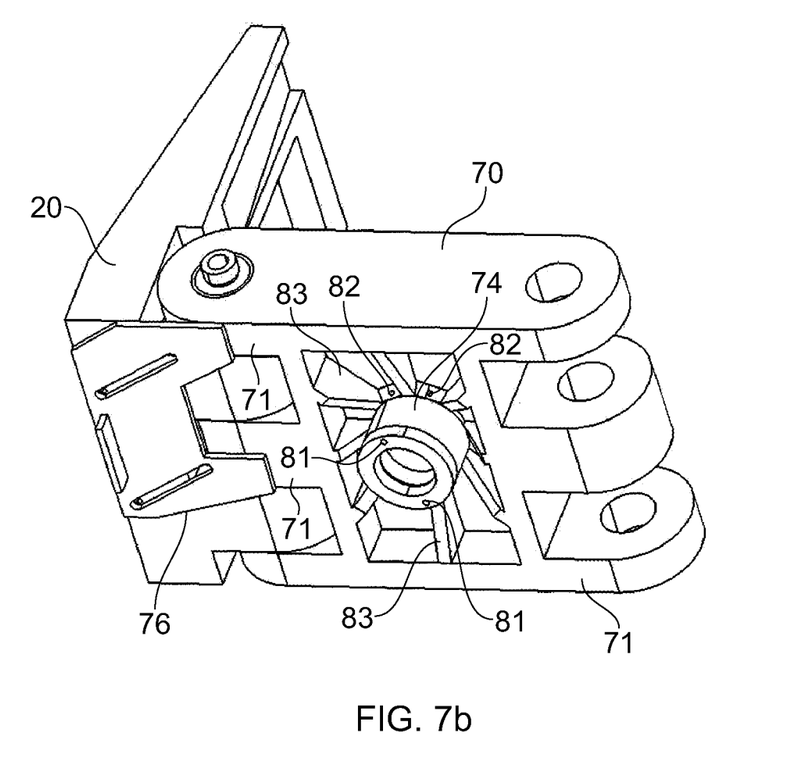
FIG. 7b is an isometric view of the underside of the crane fitting.

As shown in FIG. 7b, the underside of the lifting pad has a socket formed by the socket member 74 which is fitted into a recess in the lifting pad 70, and held in place by fasteners 82. Stiffening ribs 83 extend radially from the socket member as shown in FIG. 7b.

The ball 104 fits into the socket as shown in FIG. 10c, with the semi-spherical surface 104' of the ball engaging the semi-spherical surface 84 of the socket. The ball 104 carries a retaining ring 86 shown in FIGS. 10b and 10c. After the ball has been inserted, the retaining ring is secured in place by a pair of fastening studs which pass through the retaining ring 86 into holes 81 in the socket member shown in FIG. 7b. One of the fastening studs 87 is shown in FIG. 10b. Thus the retaining ring 86 ensures that the ball 104 cannot drop out of the socket if the crane cable goes slack. A consequence of this is that the retaining ring 86 and locking plate 76 must support the weight of the hook.

If the locking plate 76 is insufficiently strong to support the full weight of the hook when the crane cable goes slack, then two alternative arrangements are possible:
- the locking plate 76 may be omitted entirely, and the lifting pad held in its operative position manually until the crane hook is in place and carrying the weight of the lifting pad;
- the retaining ring 86 may be omitted, and the socket in the lifting pad made deeper to ensure that the ball 104 does not slip out due to the action of side loads.

After the ball 104 has been secured in place, the hook 100 is lifted and the lifting pad 70 transmits the vertical lifting load to the aircraft via the side stay fitting 7 and spar 8. Once the aircraft is level, a support cradle is placed under the wing, and the lifting load from the crane is gradually reduced until the support cradle carries the full weight. The fitting 10 is then engaged by the conventional crane hook which was previously used to lower it into place; removed from the side stay fitting 7, and lifted away from the aircraft.

The ball and socket joint coupling the hook assembly 100 to the fitting 10 can accommodate a relative rotation in any direction of 15 degrees. This accounts for the changing attitude of the aircraft as it is lifted and the probability that the slope of the contact surface of the lower flange 64 is not horizontal when the aircraft is horizontal. Note that in the case of the A340 the slope of the contact surface of the lower flange 64 is 11 degrees when the aircraft is horizontal.

The holes in the hinge lugs 71 and/or the hinge lugs 23 are oval (with the long axis of the oval aligned vertically). This provides a floating connection which enables the lifting pad 70 to float in the vertical direction, ensuring that substantially none of the vertical lifting loads are transferred into the vertical plate 20. Therefore all of the vertical lifting load passes through the lifting pad 70 into the lower flange 64 of the side stay fitting 7 and the rear spar of the wing.

Any side loads (i.e. fore-and-aft and transverse loads) arising from the lifting operation (typically due to the top of the crane jib slewing relative to the aircraft, which may arise from the aircraft lurching as it lifts) will pass from the lifting pad 70 into the attachment assembly 11, and then into the sidestay fitting 17. The hinge lugs 71, 23 are designed to accept a sideload of 33% of the vertical load, acting simultaneously with the vertical load and acting in any direction.

Aluminium alloys can be used for some of the major components of the fitting 10, thus reducing its weight.

Clearances are minimised so as to prevent as far as possible any slipping in the assembly. Pre-tensioning of the assembly using the wedges 50 removes backlash in the unloaded assembly.

Contact with the bottom wing skin (not shown) are restricted to areas immediately below the side stay fitting 7 and the bottom flange and web of the rear spar 8.

It should be noted that although the fitting and crane hook assembly described above are configured to lift an A340 aircraft via its side stay fitting, the invention is not limited to such use. Therefore a similar fitting and/or crane hook assembly may be used to lift the A340 via another strong point, to lift another aircraft, or to lift any other item.

Although the invention has been described above with reference to one or more preferred embodiments, it will be appreciated that various changes or modifications may be made without departing from the scope of the invention as defined in the appended claims.

The invention claimed is:

1. A method of lifting an item, the method comprising:
providing a fitting comprising an attachment member and a lifting member which is pivotally coupled to the attachment member;
lowering the fitting into position with the lifting member positioned below the attachment member;
securing the attachment member to the item;
lifting the lifting member by rotating it about its pivot until it engages the item;
engaging the lifting member with a crane hook; and
transmitting lifting load from the crane hook to the item via the lifting member.

2. The method of claim 1 further comprising:
transmitting side load from the crane hook to the item via the attachment member.

3. The method of claim 1 wherein the item is an aircraft.

4. The method of claim 3, further comprising removing the fitting from the aircraft after the lifting operation.

5. The method of claim 3 wherein the lifting load is transmitted to a spar of a wing of the aircraft.

6. The method of claim 5 wherein the lifting load is transmitted to the spar by a side stay fitting of a main landing gear.

7. The method of claim 1 wherein the fitting is lowered into position with a lowering device.

8. The method of claim 7 wherein the lowering device is a crane hook.

9. The method of claim 1 wherein the attachment member and lifting member engage the same reinforced region of the item.

10. The method of claim 1 wherein the fitting weighs over 100 kg.

11. The method of claim 10 wherein the lifting member weighs less than 100 kg.

12. The method of claim 1 wherein substantially no vertical lifting load is transferred from the crane hook to the item via the attachment member.

13. The method of claim 12 wherein the lifting member is pivotally coupled to the attachment member by a floating connection.

14. The method of claim 1, wherein the lifting member is lifted by rotating it about its pivot manually by one or two people.

* * * * *